United States Patent [19]

Yoshikawa

[11] Patent Number: 5,412,484
[45] Date of Patent: May 2, 1995

[54] VARIABLE RATE CODER/DECODER SYSTEM

[75] Inventor: Hidetaka Yoshikawa, Hino, Japan

[73] Assignee: Kabushiki Kaisha Toshiba, Kawasaki, Japan

[21] Appl. No.: 94,867

[22] Filed: Jul. 22, 1993

[30] Foreign Application Priority Data

Jul. 23, 1992 [JP] Japan .................................. 4-197091

[51] Int. Cl.⁶ ............................................ H04N 1/415
[52] U.S. Cl. ..................................... 358/433; 358/426; 358/430; 358/261.2; 348/405; 348/419
[58] Field of Search ...................... 358/426, 433, 261.2, 358/430; 348/405, 419

[56] References Cited

U.S. PATENT DOCUMENTS 4,984,076 1/1991 Watanabe et al. ................... 358/133
5,117,234 5/1992 Shizawa .............................. 341/143

*Primary Examiner*—Scott A. Rogers
*Assistant Examiner*—Thomas L. Stoll
*Attorney, Agent, or Firm*—Finnegan, Henderson, Farabow, Garrett & Dunner

[57] ABSTRACT

A variable rate coder/decoder system in which a quantizer, under control of a quantization controller, quantizes a signal obtained by subjecting discrete cosine transformation of a difference signal between an input signal and a signal from a frame memory storing therein a previous frame with a first quantization step width calculated based on a power value of the input signal calculated by a power calculator and a predetermined first signal-to-quantization noise ratio. In the system, further, a re-quantizer quantizes a difference signal between a signal being not quantized by the quantizer and a signal after the inverse quantization of an inverse quantizer with a second quantization step width calculated based on the power value controlled by a re-quantization controller and a predetermined second signal-to-quantization noise ratio. Variable length encoders subject the quantization output signals of the quantizer and re-quantizer to variable length encoding, decrease discard priority for the quantization output signal of the quantizer, increase discard priority for the quantization output signal of the re-quantizer, and then transmit them in the form of fixed-length cells or variable-length packets whereby, even when the amount of input data varies, its quality can be maintained constant and encoding and decoding can be realized with a high efficiency.

7 Claims, 7 Drawing Sheets

VARIABLE RATE CODER/DECODER SYSTEM

BACKGROUND OF THE INVENTION

1. Field of the Invention

The present invention relates to variable rate coder/decoder systems which are used in a packet communication system, an ATM (Asynchronous Transmission Mode) communication system or the like system and more particularly, to a variable rate coder/decoder system which is designed, in particular, for encoding and decoding picture image signals.

2. Description of the Related Art

Conventionally, encoding with fixed rate in a picture image encoder has been standardized as H.261 in the Search Group (SGXV) of the Comite Consultatif International Telegraphique et Telephonique (CCITT).

The encoding with fixed rate, however, cannot be carried out in response to the change in the amount of data in an input signal.

As an example of the prior art fixed rate encoding, a fixed rate image encoding will be explained.

FIGS. 6(a) and 6(b) are representation of a time and spatial variation in a picture image. More specifically, FIG. 6(b) shows a video signal on a display screen divided into blocks as minimum units. One block is made up of vertical 8 picture elements (pixels) and horizontal 8 pixels. FIG. 6(a) is a diagram for explaining image movement compensation, in which case, the picture image (in the illustrated example, moving picture) varies with time and the movement data of the image can be expressed on a block basis. That is, image data has spatial data in a still screen with time stopped and has time data varying with time between screens or frames. By effectively utilizing the above data property, picture image encoding can be carried out.

FIG. 7 shows a block diagram of an arrangement of a prior art fixed-rate encoder system.

In operation of the prior art fixed-rate encoder system of FIG. 7, a video signal is input as an input signal on a block basis from an input terminal 700 to the encoder system. More specifically, a subtraction circuit 701 calculates a difference between the input signal received from the input terminal 700 and an output signal received from a loop filter 710 and applies the calculated difference to a discrete cosine transformer 703 for performing discrete cosine transformation. A difference signal corresponding to one block applied to the discrete cosine transformer 703 is subjected to a two-dimensional (8×8) discrete cosine transformation according to the following equation (1).

$$F(x,y) = (1/4)c(u)c(v)\sum_{u=0}^{7}\sum_{v=0}^{7} f(u,v)\cos\{(2x+1)\pi u/16\} \cdot \cos\{(2y+1)\pi v/16\} \quad (1)$$

where,
when u,v=0, c(u),c(v)=1/SQRT(2)
when u,v≠0, c(u),c(v)=1
x,y,u,v=0,1,2,3,4,5,6,7

In the above, SQRT(A) denotes a square root of A.

Thereafter, in a quantizer 704, the elements of the difference signal transformed by the discrete cosine transformer 703 are subjected to a quantization to obtain quantization codes which in turn are sent to a multiplex coder 712. A quantization step width of the quantizer 704 is controlled by a coder controller 705 and linear quantization is carried out in the quantizer 704 with the quantization step width selected by the coder controller 705.

The coder controller 705, in order to realize transmission with fixed rate, changes some parameters, e.g., the quantization step width, block reference, decimation rate, etc. to controllably adjust the amount of data to be encoded. More specifically, the coder controller 705 monitors the state of a transmission buffer 713, and when the buffer almost overflows, increases the quantization step width to decrease the amount of data to be generated and thereby prevent the buffer overflowing. Further, when the quantization step width is increased but still the buffer is almost overflowing, the coder controller 705 perform decimation to prevent the buffer overflowing. Conversely, when the data of the buffer is becoming almost nothing, the coder controller 705 controllably reduces the step width to increase the amount of data to be encoded and maintain the fixed-rate transmission.

In order to generate a motion compensation interframe prediction compensation signal, a quantization signal quantized in the quantizer 704 is sent to an inverse quantizer 706 where the quantization signal is subjected to an inverse quantization, and further sent to an inverse discrete cosine transformer 707 where the quantization signal subjected to the inverse quantization is subjected to a two-dimensional (8×8) inverse discrete cosine transformation according to the following equation (2).

$$f(x,y) = (1/4)\sum_{u=0}^{7}\sum_{v=0}^{7} c(u)c(v)F(x,y)\cos\{(2x+1)\pi u/16\} \cdot \cos\{(2y+1)\pi v/16\} \quad (2)$$

where,
when u,v=0, c(u),c(v)=1/SQRT(2)
when u,v≠0, c(u),c(v)>1
x,y,u,v=0,1,2,3,4,5,6,7

In the above, SQRT(A) denotes a square root of A.

Next, an adder 708 adds together the signal subjected to the inverse discrete cosine transformation received from the inverse discrete cosine transformer 707 and the output of the loop filter 710 for the previous frame received through a switch 711 and outputs its added result to a motion compensator 709.

The motion compensator 709 searches one of the past blocks highest in matching degree with the current block, finds a difference between the blocks and remove its correlation in the time direction.

The loop filter 710 is a two-dimensional prediction filter made up of one-directional filters for horizontal and vertical components. That is the loop filter 710 is a non-recursive filter having coefficients of ¼, ½ and ¼. However, the filter has coefficients of 0, 1 and 0 at its edges. This filter is also a low pass filter which can remove high-frequency noise and which output is the same as a reproduction signal obtained at a decoder side.

The operation from the inverse quantizer 706 to the loop filter 710, which corresponds to generation, in the encoder system side, of a reproduction signal to be obtained in the decoder system side, is designed so that, at the time of computing a difference from the previous frame, a decode signal to be reproduced at the decoder system side is reproduced in the encoder system side to find the difference, thus preventing asynchronous state between the decoder and encoder system sides.

A hybrid encoded signal subjected to the motion compensation for removal of redundancy in the time direction in the interframe prediction and also to the cosine transformation for removal of redundancy in the spatial direction is sent from the quantizer 704 to the multiplex coder 712. The multiplex coder 712 converts the received signal into a frame signal according to the format determined by H.261 of the SGXV of CCITT, and sends the frame signal to the transmission buffer 713. Further, the transmission buffer 713, prior to output of the frame data received from the multiplex coder onto the associated line, temporarily stores the frame data in a memory and informs the coder controller 705 of how much the data is accumulated in the buffer for fixed-rate transmission. Thereafter, a transmission coder 714 outputs the frame data onto the line.

Next, explanation will be made as to a prior art decoder system for decoding the fixed-rate encoded signal.

FIG. 8 is a block diagram of an arrangement of a prior art fixed-rate decoder system.

A transmission decoder 800 first receives frame data from a line and sends the data to a reception buffer 801. The reception buffer outputs data to a multiplex decoder 802, which in turn extracts encoded data from the frame data.

In an inverse quantizer 803, the quantized data received from the multiplex decoder 802 is inversely quantized and output to an inverse discrete cosine transformer 804. In the inverse discrete cosine transformer 804, the inversely-quantized data received is subjected to a two-dimensional (8×8) inverse discrete cosine transformation according to the above equation (2). Then, an adder 805 adds together an output signal received from the inverse discrete cosine transformer 804 and an output signal received from a loop filter 807 to generate a decoded signal. In this case, a motion compensator 806 extracts a motion vector from the frame signal and performs the same operation as the motion compensator 709 in the encoder system of FIG. 7. While, the loop filter 807 also performs the same operation as the loop filter 710 in the encoder system of FIG. 7.

In this manner, the prior art fixed-rate image encoding and decoding are carried out.

However, in the case where image encoding is carried out with fixed rate as mentioned above, when the motion of the image is rapid, the amount of data to be generated becomes much, and in order to suppress the amount of data, the coder controller 705 functions to lower the communication quality or performs its decimating operation. For this reason, the resultant image decoded and reproduced becomes deteriorated in quality.

Conversely, when the motion of an image is slow, the amount of data in the transmission buffer 713 becomes less, for which reason the coder controller 705 functions to raise the quality and increase the amount of data to be encoded.

Accordingly, the prior art fixed-rate encoder system has a problem that, since the amount of data to be encoded cannot be changed in response to a variation in an image, its encoding efficiency is not satisfactory.

The prior art encoder system also has another problem that, when missing of encoded data takes place during transmission of the encoded data, its communication quality is remarkably deteriorated, i.e., the system is easily affected by the data missing.

Further, the prior art fixed-rate encoder system has a problem that the system is designed to lower its quality and suppress generation of the amount of data to be output in response to an increase in the amount of input data generated from a rapid motion image, and the system is also designed to increase the quality and increase the amount of output data in response to a decrease in the amount of input data generated from a slow motion image, which results in that the increase of the amount of input data leads to deterioration of the quality while the decrease of the amount of input data leads to reduction of the encoding efficiency. The prior art system also has another problem that packet discard results in remarkable deterioration of the reproduced data quality.

SUMMARY OF THE INVENTION

It is an object of the present invention to provide a variable rate coder/decoder system which can solve the above problems in the prior art and which can maintain constant quality even when the amount of input data is changed, thereby realizing efficient coding and decoding.

In accordance with an aspect of the present invention, the above object is attained by providing a variable rate coder/decoder system having encoder means for encoding an input signal with a variable rate and decoder means for decoding an encoded signal to a decoded signal, in which the encoder means comprises: prediction signal generation means for generating a prediction signal at the time of decoding with respect to a series of input signal and signal conversion means for performing predetermined transformation over a prediction error signal corresponding to a difference between the prediction signal generated by the prediction signal generation means and the input signal; power calculation means for calculating an average power of the input signal; first quantization control means for calculating a first quantization step width on the basis of the average power value calculated by the power calculation means and a predetermined first signal-to-quantization noise ratio and for controlling the quantization with the first quantization step width; first quantization means for quantizing an output signal of the signal conversion means with the first quantization step width of the first quantization control means; first variable length encoder means for subjecting a signal quantized by the first quantization means to a variable length encoding; second quantization control means for calculating a second quantization step width on the basis of the average power value calculated by the power calculation means; a predetermined second signal-to-quantization noise ratio larger than the predetermined first signal-to-quantization noise ratio and the signal-to-quantization noise ratio, and for controlling the quantization with the second quantization step width; difference signal generation means for generating a difference signal on the basis of an output signal of the signal conversion means and a signal corresponding to inverse quantization of the quantization signal quantized by the first quantization means; second quantization means for quantizing the difference signal generated by the difference signal generation means with the second quantization step width by the second quantization control means; second variable length encoding means for subjecting a quantization signal quantized by the second quantization means to a variable length encoding; and composition means for adding together signals subjected to the variable length encoding by the first and second variable length encoder means.

In the present invention, the composition means decreases discard priority for the output signal of the first variable length encoder means, increases discard priority for the output signal of the second variable length encoder means, adds together resultant decreased- and increased-priority signals, and transmits the added signal in the form of fixed-length cells or variable-length packets.

In the present invention, the decoder means of the system comprises: separation means for separating an output signal of the composition means into a signal subjected to the variable length encoding by the first variable length encoder means and a signal subjected to the variable length encoding by the second variable length encoder means; first inverse variable length encoder means for restoring back to a signal being not encoded the signal subjected to the variable length encoding by the first variable length encoder means and separated by the separation means; second inverse variable length encoder means for restoring back to a signal being not encoded the signal subjected to the variable length encoding by the second variable length encoder means and separated by the separation means; first inverse quantization means for inversely quantizing an output signal of the first inverse variable length encoder means to generate the first quantization signal; second inverse quantization means for inversely quantizing an output signal of the second inverse variable length encoder means to generate the second quantization signal; signal inverse transformation means for performing inverse transformation of the predetermined transformation over the signal subjected to the inverse quantization by the first inverse quantization means; first decoded signal generation means for generating a first decoded signal having the first signal-to-quantization noise ratio on the basis of an output signal of the signal inverse transformation means; and second decoded signal generation means for generating a second decoded signal having the second signal-to-quantization noise ratio on the basis of the first decoded signal and an output signal of the second inverse quantization means.

Accordingly, since constant-level quantization and more-than-constant-level re-quantization are carried out in response to the input signal, the quantization step width for the input signal can be varied, so that an encoding rate can be changed and thus a high encoding efficiency can be obtained.

Since the constant-level quantization and more-than-constant-level quantization are carried out, the quality at the time of decoding can be maintained to be always a constant level or higher. In this connection, when discard priority is set to be low for a constant-level quantized signal, deterioration of cells or packets caused by its discard during transmission can be minimized.

DESCRIPTION OF THE PREFERRED EMBODIMENTS

An embodiment of the present invention will be explained with reference to the attached drawings.

Figure 1:
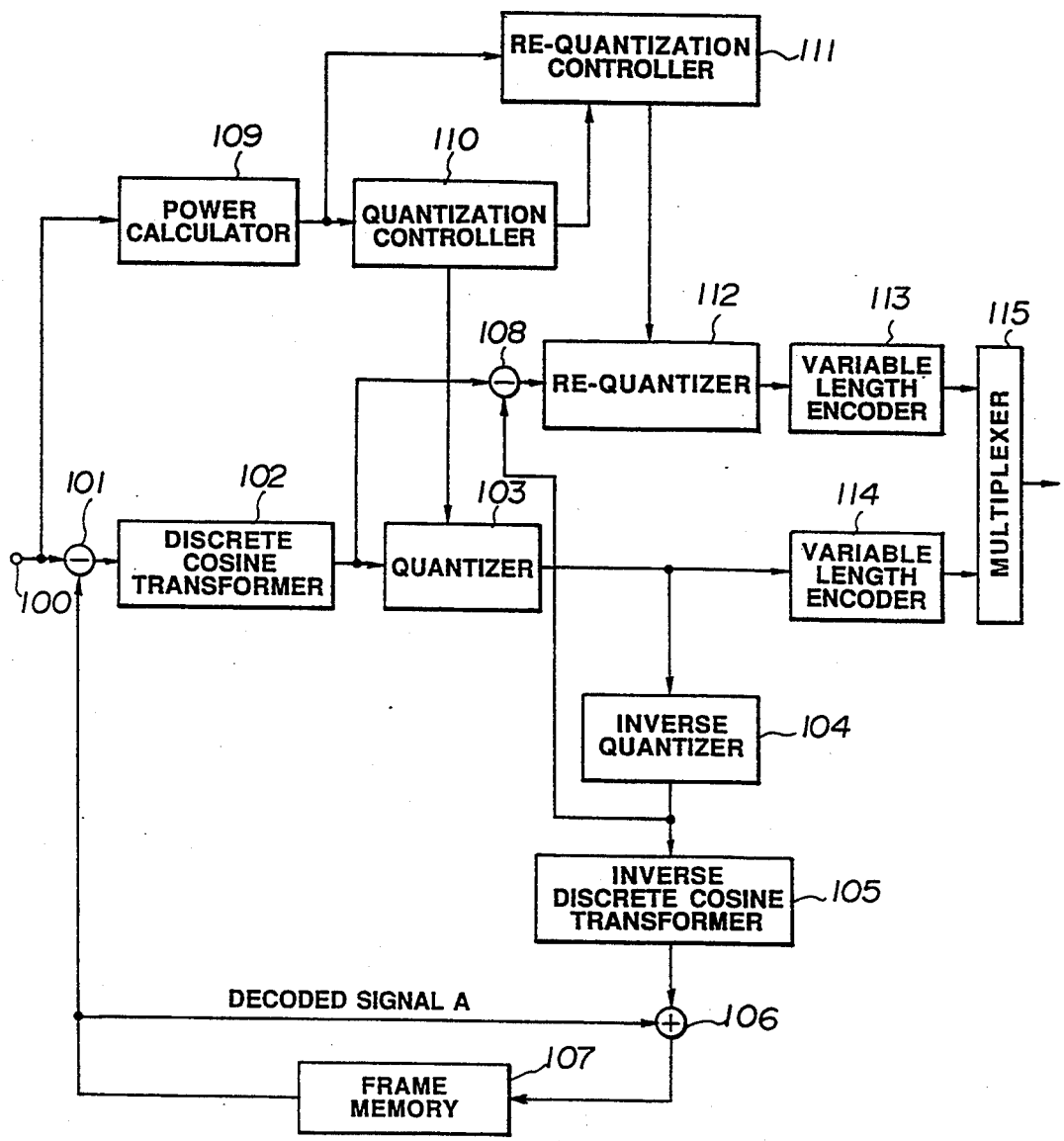
FIG. 1 is a block diagram of an arrangement of a variable rate encoder system in accordance with an embodiment of the present invention.

Referring first to FIG. 1, there is shown a block diagram of an arrangement of a variable rate encoder system in accordance with an embodiment of the present invention.

In FIG. 1, when a series of digitized video signals x(n,m) is first input to a subtracter 101 of the system from an input terminal 100, the subtracter 101 subtracts a decoded signal A of a previous screen or frame already stored in a frame memory 107 from the video signal series x(n,m) and outputs a signal y(n,m) to a discrete cosine transformer 102. The discrete cosine transformer 102 in turn performs two-dimensional (8×8) discrete cosine transformation according to the following equation (3) to generate a signal f(n,m).

$$f(n,m) = (1/4)c(u)c(v) \sum_{u=0}^{7} \sum_{v=0}^{7} y(u,v)\cos\{(2n + 1)\pi u/16\} \cdot \quad (3)$$

$$\cos\{(2m + 1)\pi v/16\}$$

where
when $u,v=0$, $c(u),c(v)=1/SQRT(2)$
when $u,v \neq 0$, $c(u),c(v)=1$
$n,m,u,v=0,1,2,3,4,5,6,7$
In the above, SQRT(A) denotes a square root of A.

A power calculator 109, when receiving the 8×8 video signal x(n,m) from the terminal 100, calculates a power ($\sigma$ 2) with use of the 8×8 video signal x(n,m) according to the following equation (4) and outputs its result to a quantization controller 110 and a re-quantization controller 111. The symbol ' ' denotes n-th power. In this case, '$\sigma$ 2' denotes the second power of $\sigma$.

$$\sigma^\wedge 2 = (1/64) \sum_{n=0}^{7} \sum_{m=0}^{7} x(n,m)^\wedge 2 \quad (4)$$

The quantization controller 110, on the basis of the power value received from the power calculator 109, controls a quantization step width Δi of a quantizer 103 which quantizes the signal f(n,m) transformed at the discrete cosine transformer 102. The quantization step width Δi is set so that the quality when only the quantization signal by the quantizer 103 is decoded, i.e., a signal-to-quantization noise ratio satisfies SNRi. Accordingly, the quantizer 103 quantizes the output signal f(n,m) of the discrete cosine transformer 102 under control of the quantization controller 110 over the quantization step width $\Delta i$.

Further, a variable length encoder 114 performs compression over an encoded data $q(n,m)$ received from the quantizer 103. In this connection, the variable length encoding is prescribed by H.261 of the CCITT.

The encoded data $q(n,m)$ as the output of the quantizer 103 is also subjected at the inverse quantizer 104 to an inverse quantization to generate an inverse quantization signal $ivq(n,m)$. The inverse quantization signal $inv(n,m)$ is then subjected at an inverse discrete cosine transformer 105 to an inverse discrete cosine transformation. The inverse discrete cosine transformation is carried out according to the following equation (5).

$$z(n,m) = (1/4) \sum_{u=0}^{7} \sum_{v=0}^{7} c(u)c(v)ivq(n,m)\cos\{(2n+1)\pi u/16\} \cdot \cos\{(2m+1)\pi v/16\} \quad (5)$$

where
when $u,v=0$, $c(u),c(v)=1/SQRT(2)$
when $u,v \neq 0$, $c(u),c(v)=1$
$n,m,u,v=0,1,2,3,4,5,6,7$
In the above, $SQRT(A)$ denotes a square root of $A$.

An adder 106 adds together the output signal $z(n,m)$ of the inverse discrete cosine transformer 105 and an output signal of the frame memory 107 to generate a decoded signal A. The decoded signal A, which is controlled so that the signal-to-quantization noise ratio of the reproduced image becomes SNRi under control of the quantization controller 110, is stored in the frame memory 107 as a reproduced image.

Meanwhile, a subtracter 108 subtracts the output signal $ivq(n,m)$ of the inverse quantizer 104 from the output signal $f(n,m)$ of the discrete cosine transformer 102 to calculate an inverse quantization error.

The re-quantization controller 111, on the basis of the power value as the output of the power calculator 109 and the quantization step width $\Delta i$ calculated at the quantization controller 110, finds a re-quantization step width $\Delta j$ for re-quantization of the output signal of the subtracter 108. The re-quantization step width $\Delta j$ is controllably used when the re-quantizer 112 decodes the re-quantization signal, whereby the signal-to-quantization noise ratio of the decoded quality becomes SNRj.

Accordingly, the re-quantizer 112 performs quantization with the re-quantization step width $\Delta j$ found at the re-quantization controller 111 and a variable length encoder 113 performs additional compression over the encoded data.

Finally, a multiplexer 115 transmits output data of the variable length encoder 114 in the form of cells of fixed length with low discard priority, and also transmits output data of the variable length encoder 113 in the form of cells of fixed length with high discard priority.

Figure 2:
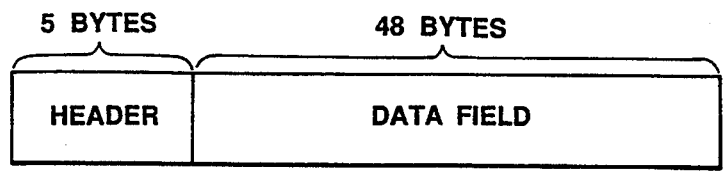
FIG. 2 shows a format of data issued from a multiplexer 115 in FIG. 1.

Shown in FIG. 2 is a format of data issued from the multiplexer 115, in which the data is transmitted as a fixed-length cell having a data field of 48 bytes and a header of 5 bytes.

Figure 3:
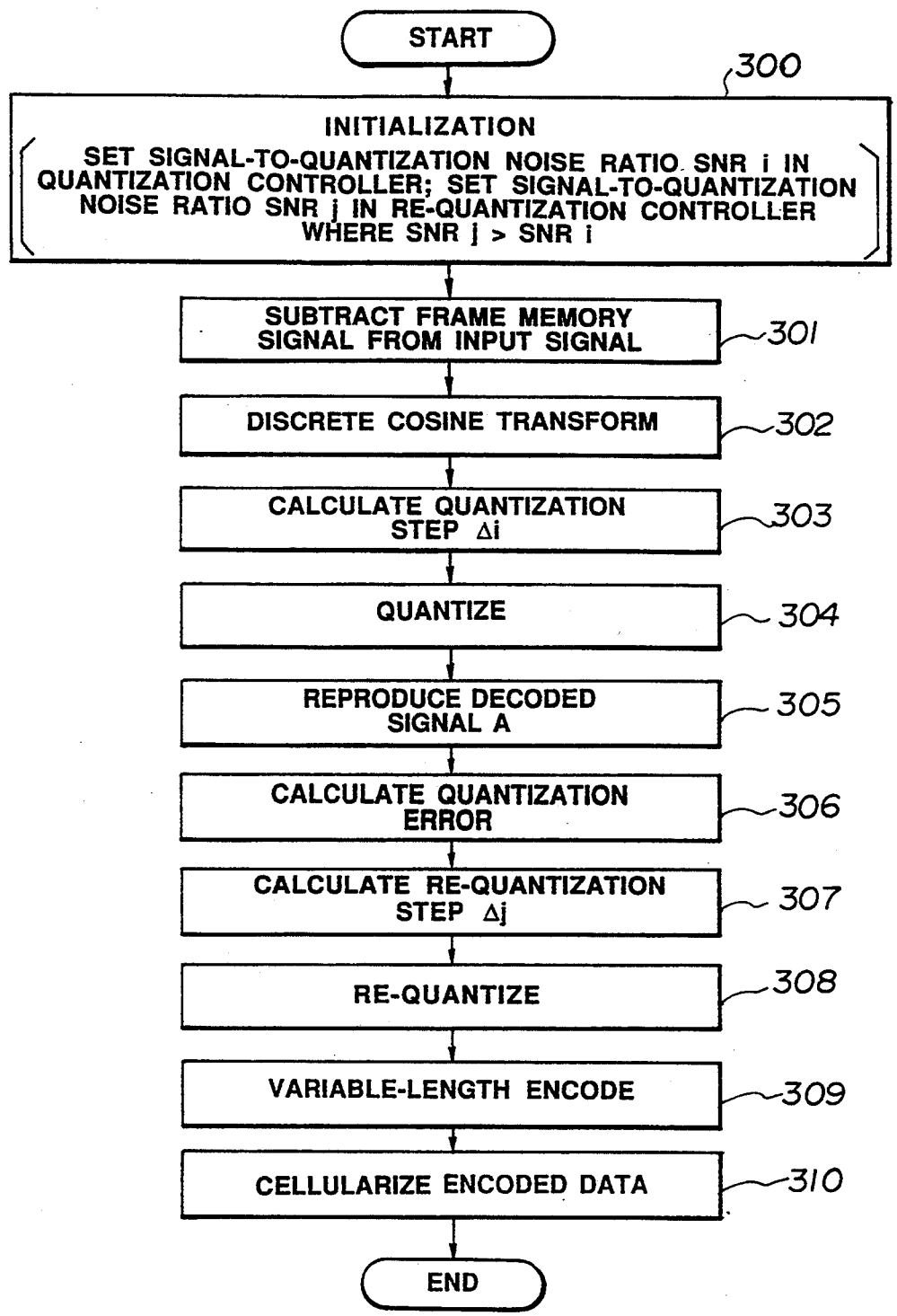
FIG. 3 is a flowchart for explaining the encoding operation of the variable rate encoder system of the embodiment.

FIG. 3 is a flowchart for explaining the encoding operation of a variable rate encoder system in accordance with an embodiment of the present invention. Such a series of encoding operation will be explained by referring to FIG. 3.

First, as initialization, a predetermined signal-to-quantization noise ratio SNRi is set in the quantization controller 110 and a predetermined signal-to-quantization noise ratio SNRj is set in the re-quantization controller 111 (step 300). In this conjunction, the predetermined signal-to-quantization noise ratio SNRj is set to be larger than the predetermined signal-to-quantization noise ratio SNRi.

After the initialization, the subtracter 101 subtracts a signal received from the frame memory 107 from an input signal received from the input terminal 100 to find a difference signal therebetween (step 301). Next, the found difference signal is subjected at the discrete cosine transformer 102 to a discrete cosine transformation (step 302). In this way, the use of such a difference signal enables lowering of the dynamic range of a signal to be encoded and further the discrete cosine transformation of the difference signal enables raising of its encoding efficiency.

The quantization step width $\Delta i$ of the signal subjected to the discrete cosine transformation is then determined (step 303). The quantization step width $\Delta i$ is calculated in the following manner so that the quality at the time of encoding becomes the predetermined signal-to-quantization noise ratio SNRi.

The quantization error ($q \wedge 2$) when the signal is quantized with the quantization step width $\Delta i$ is calculated according to the following equation (6), and the then signal-to-quantization noise ratio SNR can be expressed by the following equation (7). The symbol '$\wedge$' denotes n-th power. In this case, the symbol '$q \wedge 2$' denotes the second power of q.

$$q \wedge 2 = (\Delta i \wedge 2)/12 \quad (6)$$

$$SNR = 10 \log\{(\sigma \wedge 2)/(q \wedge 2)\} \quad (7)$$

Hence, from the equations (6) and (7), the quantization step width $\Delta i$ by which the quality at the time of decoding becomes the signal-to-quantization noise ratio SNRi is found according to the following equation (8) on the basis of the signal-to-quantization noise ratio SNRi corresponding to the quality set with the power value ($\sigma \wedge 2$) of the input signal.

$$\Delta i = SQRT[12 \cdot (\sigma \wedge 2)/\{10 \wedge (SNRi/10)\}] \quad (8)$$

After the quantization step width $\Delta i$ has been determined in this way, the signal subjected to the discrete cosine transformation is subjected at the quantizer 103 to the discrete cosine transformation (step 304) to reproduce a decoded signal A for the screen or frame quantized with the quantization step width $\Delta i$ (step 305). The decoded signal A can be reproduced by subjecting the signal quantized with the quantization step width $\Delta i$ to the inverse quantization and inverse discrete cosine transformation and then adding at the adder 106 it to the signal from the frame memory 107 having the previous frame stored therein.

Meanwhile, a difference or quantization error between the signal $f(n,m)$ subjected at the discrete cosine transformer 102 to the discrete cosine transformation and the signal $ivq(n,m)$ subjected at the inverse quantizer 104 to the inverse quantization, is found at the subtracter 108 (step 306). The re-quantizer 112 calculates a quantization step width $\Delta j$ for quantizing the difference signal $(f(n,m)-inv(n,m))$ according to the following equation (9) (step 307), where symbol INT denotes an integer function.

$$\Delta j = INT[SQRT\{12 \cdot (\sigma \wedge 2)/(10 \wedge (SNRi/10))\} - SQRT\{12 \cdot (\sigma \wedge 2)/(10 \wedge (SNRj/10))\}] \quad (9)$$

On the basis of the quantization step width Δj, the re-quantizer 112 performs quantization over the difference signal received from the subtracter 108 (step 308). The quantization of the re-quantizer 112 is the same as the quantization of the quantization step width (to cause the signal-to-quantization noise ratio to be SNRi) expressed by the following equation (10) at such a step that the signal-to-quantization noise ratio becomes SNRj. Through this re-quantization, the decoding quality can be improved from SNRi to SNRj.

$$SQRT[12 \cdot (\sigma^{\wedge}2)/\{10^{\wedge}(SNRi/10)\}] \quad (10)$$

$$SQRT[12 \cdot (\sigma^{\wedge}2)/\{10^{\wedge}(SNRj/10)\}] \quad (11)$$

Finally, the quantization signal quantized by the quantizer 103 and the re-quantization signal quantized by the re-quantizer 112 are both subjected to the variable length encoding (step 309) and then sent to the multiplexer 115. The multiplexer 115 increases a discard priority for the received re-quantization signal and decreases a discard priority for the quantization signal (step 310).

Figure 4:
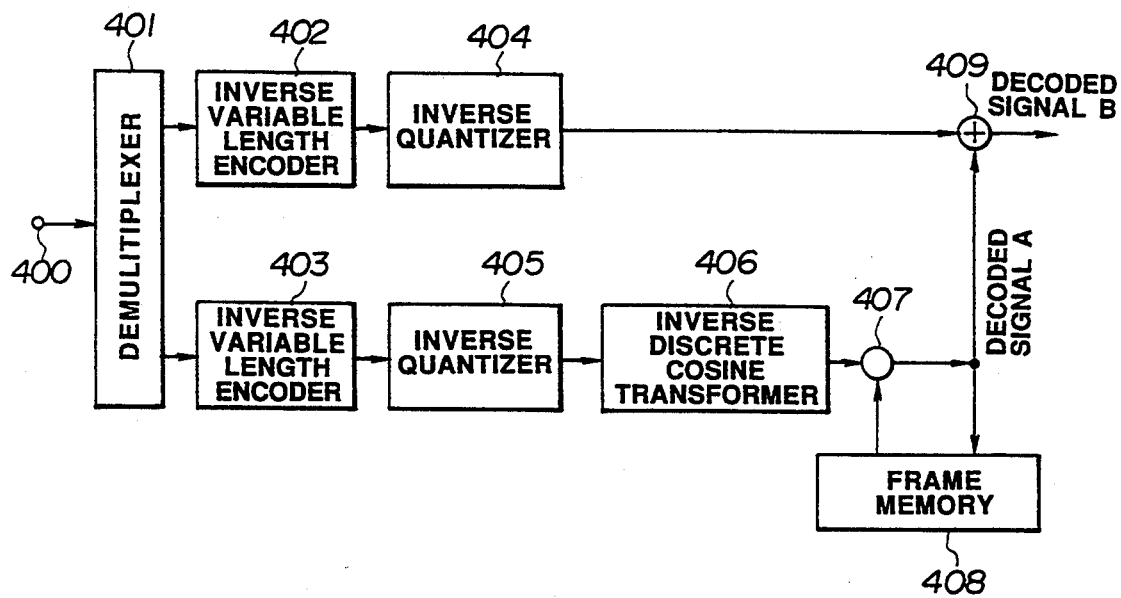
FIG. 4 is a block diagram of an arrangement of a variable rate decoder system in accordance with an embodiment of the present invention.

FIG. 4 is a block diagram of an arrangement of a variable rate decoder system in accordance with an embodiment of the present invention. This variable rate decoder system is a counterpart of the variable rate encoder system of FIG. 1 which forms a pair therewith.

A signal output from the variable rate encoder system of FIG. 1 is applied to an input terminal 400 and then to a demultiplexer 401 through a transmission line. The demultiplexer 401 separates the received cells into cells having high discard priority and cells having low discard priority, and then outputs the high-discard-priority cells to an inverse variable length encoder 402 and the low-discard-priority cells to an inverse variable length encoder 403. The inverse variable length encoders 402 and 403 return the variable-length-encoded data back to the original data not subjected to the inverse variable length encoding, and then output them to inverse quantizers 404 and 405. The inverse quantizers 404 and 405 inversely quantize the output signals of the inverse variable length encoders 402 and 403. An inverse discrete cosine transformer 406 subjects an output of the inverse quantizer 405 to an inverse discrete cosine transformation. A frame memory 408 stores therein the decoded signal for the previous frame. The decoded signal A is generated by adding together at an adder 407 an output signal of the inverse discrete cosine transformer 406 and an output of the frame memory 408.

Further, an adder 409 adds together the inverse quantization signal as an output of the inverse quantizer 404 and the decoded signal A to generate a final decoded signal B.

Figure 5:
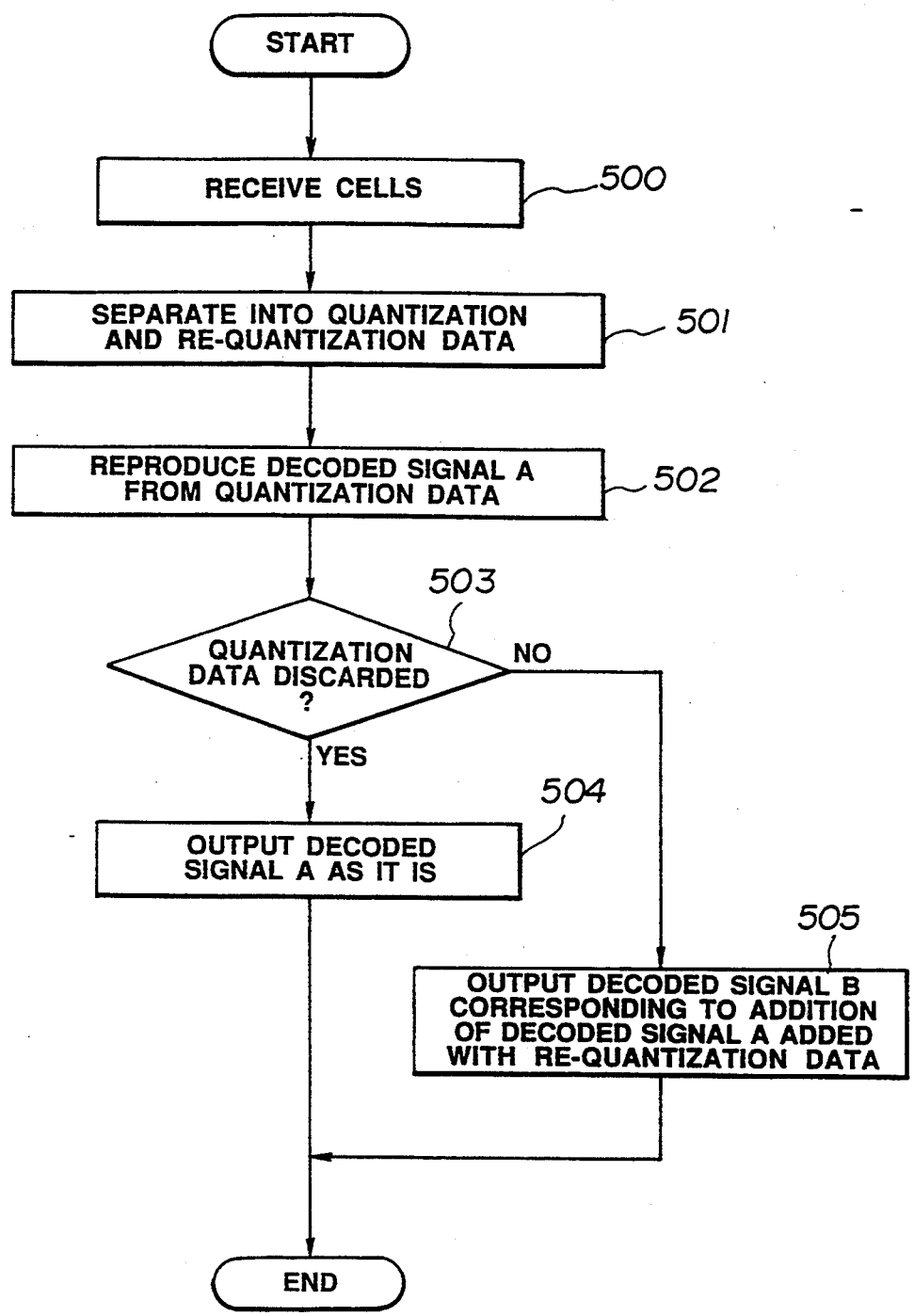
FIG. 5 is a flowchart for explaining the decoding operation of the variable rate decoder system of the embodiment.
Figure 6A:
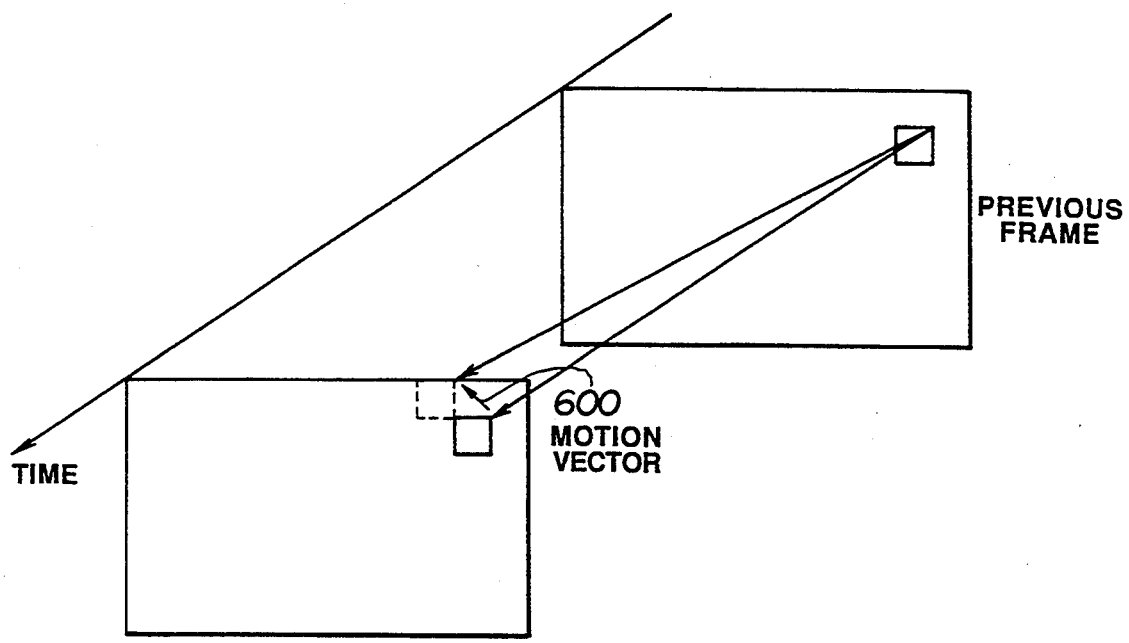
FIGS. 6(a) and 6(b) are representation of a time and spatial change in an image.
Figure 6B:
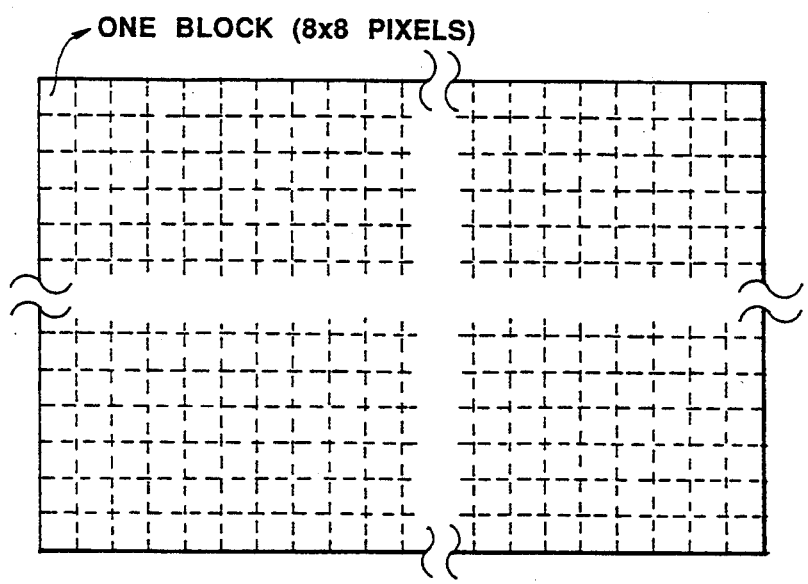
Figure 7:
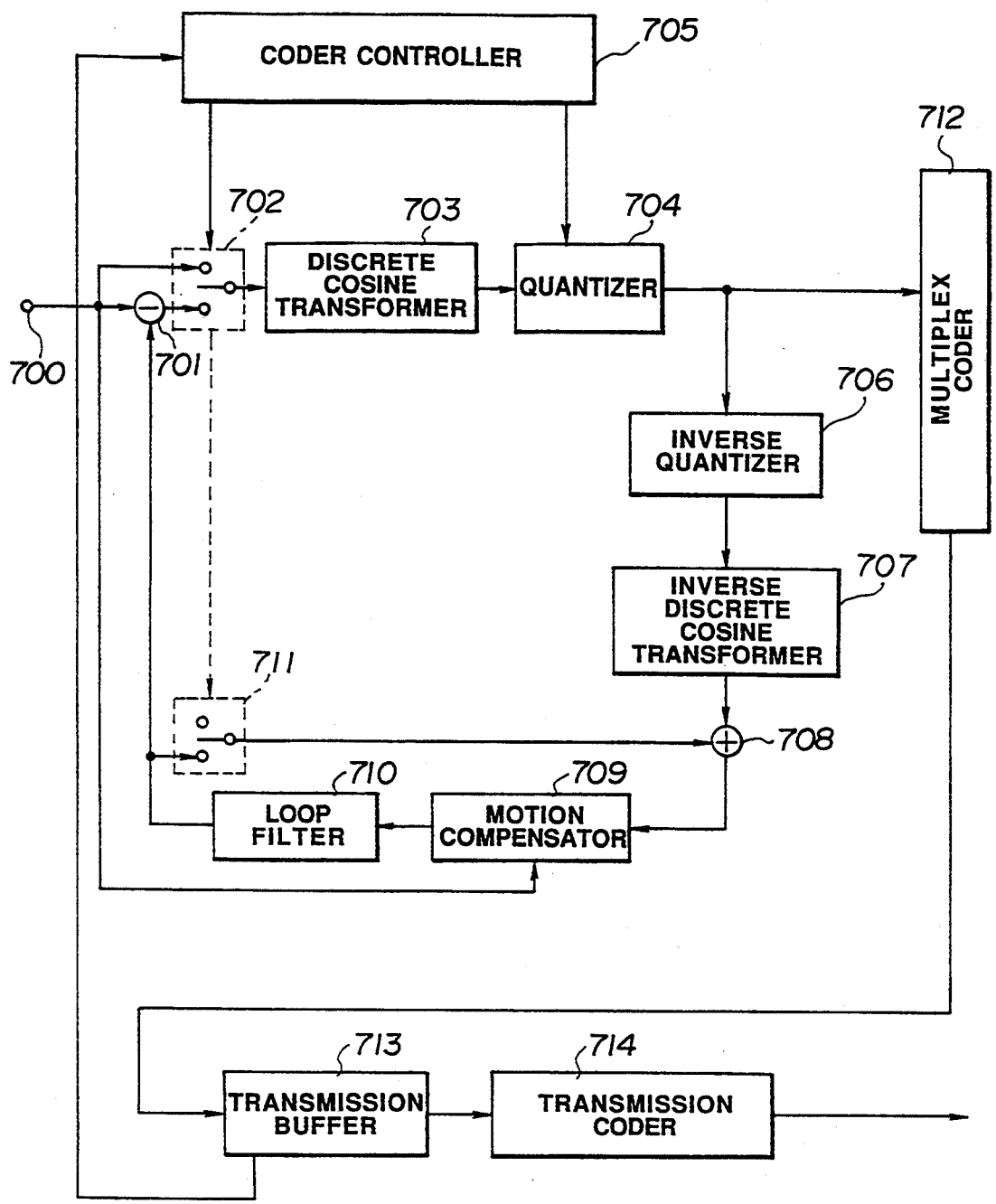
FIG. 7 is a block diagram of an arrangement of a prior art fixed-rate encoder system.
Figure 8:
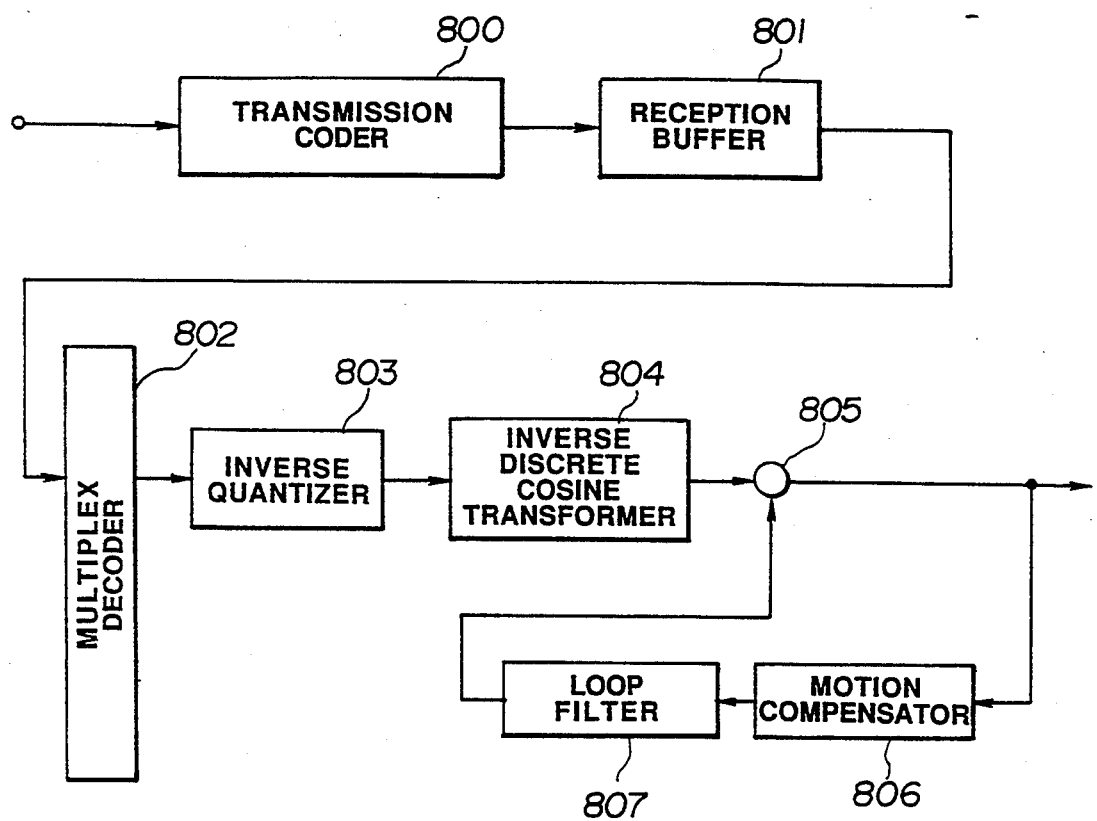
FIG. 8 is a block diagram of an arrangement of a prior art fixed-rate decoder system.

FIG. 5 is a flowchart for explaining the decoding operation of the variable rate decoder system of the embodiment of the present invention. A series of decoding operation will be explained below by referring to FIG. 5.

The demultiplexer 401 first receives cells (step 500) and divides the received cells into cells having low discard priority, i.e., cells indicative of the transmitted quantization data of the quantizer 103 of FIG. 1 and cells having high discard priority, i.e., cells indicative of the transmitted re-quantization data of the re-quantizer 112 of FIG. 1 (step 501).

Next, the decoded signal A is reproduced from the quantization data (step 502). The quality of the decoded signal A reproduced from the quantization data is controlled at the quantizer 103 in FIG. 1 with the quantization step width in such a manner that the quality becomes the signal-to-quantization noise ratio SNRi, so that the quality of the signal-to-quantization noise ratio SNRi can be reproduced at all times.

Further, it is detected whether re-quantization data cells were discarded (step 503). If cells were not discarded, the decoded signal B corresponding to an addition of the re-quantization data to the decoded signal A is output as a final decoded signal (step 505). The quality of the decoded signal B is reproduced with the quality of the signal-to-quantization noise ratio SNRj at all times since the control is made at the re-quantizer 112 in FIG. 1 with the quantization step width in such a manner that the quality becomes the signal-to-quantization noise ratio SNRj.

Meanwhile, if cells were discarded, the decoded signal A is output as it is as a final decoded signal without using the re-quantization data (step 504), so that even if cells were discarded, the quality of the signal-to-quantization noise ratio SNRi can be kept.

In accordance with the present embodiment, since the quantization step widths can be varied according to the input signal, the decoding quality can be advantageously maintained constant. Further, since an encoding rate is varied depending on the amount of input data, a high encoding efficiency can be realized.

In addition, when cells or packets having high discard priority are discarded on a transmission line, a decoded signal of cells or packets having low discard priority is output and, when cells or packets having high discard priority are not discarded, a decoded signal of cells or packets having low discard priority is added to a decoded signal of cells or packets having high discard priority and then output, whereby the quality of reproduced data such as motion pictures can be prevented from being extremely deteriorated due to the discard of the cells or packets on the transmission line.

What is claimed is:

1. A variable rate coding system including a variable rate coder comprising:

power calculation means for calculating an average power for each frame unit of an inputted digital video signal series;

first difference calculation means for calculating a difference between one frame of the inputted digital video series and a frame immediately previous to said one frame of the digital video signal series;

coordinate transformation means for subjecting the difference calculated by the first difference calculation means to a coordinate transformation;

quantization means for quantizing an output of the coordinate transformation means;

quantization control means for controlling a quantization step width of the quantization means on the basis of an output of the power calculation means;

first variable length encoder means for subjecting an output of the quantization means to a variable length encoding;

decoded signal generating means for subjecting the output of the quantization means to an inverse quantization and an inverse coordinate transformation, adding the output being subjected to the inverse coordinate transformation to the digital video signal series of said frame immediately previous to said one frame, and outputting an added signal to the first difference calculation means;

second difference calculation means for calculating a difference between an inversely quantized signal generated by the decoded signal generating means and an output of the coordinate transformation means;

re-quantization means for re-quantizing the difference calculated by the second difference calculation means;

re-quantization control means for controlling a re-quantization step width of the re-quantization means on the basis of the output of the power calculation means;

second variable length encoding means for subjecting an output of the re-quantization means to a variable length encoding; and multiplexing means for combining the outputs of the first and second variable length encoder means to output a combined signal, the combined signal being added with discard priorities in a manner such that the output of the second variable length encoder means is added with a higher discard priority than the discard priority added to the output of the first variable length encoder means.

2. The variable rate coder as set forth in claim 1, wherein the coordinate transformation means comprises discrete cosine transformation means.

3. The variable rate coder as set forth in claim 2, wherein the decoded signal generating means comprises:

a first frame memory for storing the digital video signal series of the immediately previous frame;

first inverse quantization means for inversely quantizing the output of the quantization means;

first inverse discrete cosine transformation means for subjecting an output of the first inverse quantization means to an inverse discrete cosine transformation;

addition means for adding the digital video signal series stored in the first frame memory to an output of the first inverse discrete cosine transformation means;

means for updating a storage content of the first frame memory by an output of the addition means; and means for outputting the digital video signal series stored in the first frame memory to the first difference calculation means.

4. The variable rate coding system as set forth in claim 1, further including a variable rate decoder for decoding a signal received from said variable rate coder, the variable rate decoder comprising:

demultiplexing means for receiving a signal transmitted from the multiplexing means and separating the received signal into an output of the first variable length coder means and an output of the second variable length encoder means;

first inverse variable length encoder means for subjecting the output of the first variable length encoder means separated by the demultiplexing means to an inverse variable length encoding;

first inverse quantization means for inversely quantizing an output of the first inverse variable length encoder means;

inverse coordinate transformation means for subjecting an output of the second inverse quantization means to an inverse coordinate transformation;

second inverse variable length encoder means for subjecting the output of the second variable length encoder means separated by the demultiplexing means to an inverse variable length encoding;

second inverse quantization means for inversely quantizing an output of the second inverse variable length encoder means;

a first frame memory for storing the digital video signal series of an immediately previous one frame of the received signal; and means for adding the digital video signal series of the immediately previous one frame of the received signal to an output of the inverse coordinate transformation means and further adding to the thus added signal an output of the third inverse quantization means to output an added signal.

5. The variable rate decoder as set forth in claim 4, wherein the inverse coordinate transformation means comprises an inverse discrete cosine transformation means.

6. A variable rate coder/decoder system including a variable rate coder for encoding an inputted digital video signal series to output an encoded signal to a transmission route and a variable rate decoder for receiving a signal transmitted from the variable rate coder via the transmission route and decoding the received signal to output a decoded signal, the variable rate coder comprising:

power calculation means for calculating an average power for each frame unit of the inputted digital video signal series;

first difference calculation means for calculating a difference between one frame of the inputted digital video signal series and a frame immediately previous to said one frame of the digital video signal series;

discrete cosine transformation means for subjecting the difference calculated in the first difference calculation means to a discrete cosine transformation;

quantization mans for quantizing an output of the discrete cosine transformation means;

quantization control means for controlling a quantization step width of the quantization means on the basis of an output of the power calculation means;

first variable length encoder means for subjecting an output of the quantization means to a variable length encoding;

memory update means, including a first frame memory for storing the digital video signal series of an immediately previous one frame of the inputted digital video signal series, first inverse quantization means and first inverse discrete cosine transformation means, said memory update means being adapted for outputting the digital video signal series stored in the first frame memory to the first difference calculation means, inversely quantizing the output of the quantization means by the first inverse quantization means, subjecting an output of the first inverse quantization means to an inverse discrete cosine transformation by the first inverse discrete cosine transformation means, adding the digital video signal series stored in the first frame memory to an output of the first inverse discrete cosine transformation means, and updating a storage content of the first frame memory by an added output signal;

second difference calculation means for calculating a difference between the output of the discrete cosine transformation means and the output of the first inverse quantization means;

re-quantization means for re-quantizing the difference calculated in the second difference calculating means;

re-quantization control means for controlling a re-quantization step width of the re-quantization means on the basis of the output of the power calculation means;

second variable length encoding means for subjecting an output of the re-quantization means to a variable length encoding; and multiplexing means for combining the outputs of the first and second variable length encoder means and transmitting a combined signal, the combined signal being added with discard priorities in a manner such that the output of the second variable length encoder means is added with a higher discard priority than the discard priority added to the output of the first variable length encoder means; and the variable length decoder comprises:

demultiplexing means for receiving a signal transmitted from the multiplexing means and separating the received signal into an output of the first variable length encoder means and an output of the second variable length encoder means;

first inverse variable length encoder means for subjecting the output of the first variable length encoder means separated by the demultiplexing means to an inverse variable length encoding;

second inverse quantization means for inversely quantizing an output of the first inverse variable length encoder means;

second inverse discrete cosine transformation means for subjecting an output of the second inverse quantization means to an inverse discrete cosine transformation;

second inverse variable length encoder means for subjecting the output of the second variable length encoder means separated by the demultiplexing means to an inverse variable length encoding;

third inverse quantization means for inversely quantizing an output of the second inverse variable length encoder means;

a second frame memory for storing the digital video signal series of the immediately previous one frame of the received signal; and means for adding the digital video signal series of the immediately previous one frame of the received signal to an output of the inverse coordinate transformation means and adding to the thus added signal an output of the third inverse quantization means to output an added signal.

7. A variable length coder/decoder system as set forth in claim 6, wherein the transmission route performs a discard processing of the outputs of the first and second variable length encoder means in accordance with discard priorities.

* * * * *

UNITED STATES PATENT AND TRADEMARK OFFICE
CERTIFICATE OF CORRECTION

PATENT NO. : 5,412,484
DATED : May 02, 1995
INVENTOR(S) : Hidetaka YOSHIKAWA

It is certified that error appears in the above-indentified patent and that said Letters Patent is hereby corrected as shown below:

Claim 6, Column 12, Line 42, change "mans" to --means--.

Signed and Sealed this

Twentieth Day of February, 1996

Attest:

BRUCE LEHMAN

Attesting Officer    Commissioner of Patents and Trademarks